United States Patent [19]

Wagner et al.

[11] Patent Number: 4,651,111

[45] Date of Patent: Mar. 17, 1987

[54] PHOTOELECTRIC CURRENT AMPLIFIER

[75] Inventors: Elmar Wagner, Heilbronn; Stefan Dermitzakis, Heilbronn-Neckargartach, both of Fed. Rep. of Germany

[73] Assignee: Telefunken electronic GmbH, Heilbronn, Fed. Rep. of Germany

[21] Appl. No.: 711,443

[22] Filed: Mar. 12, 1985

[30] Foreign Application Priority Data

Mar. 17, 1984 [DE] Fed. Rep. of Germany ....... 3409820

[51] Int. Cl.[4] ............................................. H03F 17/00
[52] U.S. Cl. .................................. 330/59; 250/214 A
[58] Field of Search ...................... 330/59, 124 R, 295; 250/213 R, 214 A, 578

[56] References Cited

U.S. PATENT DOCUMENTS

| 2,342,521 | 2/1944 | Thom . | |
|---|---|---|---|
| 3,437,793 | 4/1969 | Van Berkel et al. | 250/578 |
| 3,454,160 | 7/1969 | Schafer | 250/578 |
| 3,972,622 | 8/1976 | Mason et al. | 250/578 |
| 4,117,460 | 9/1978 | Walworth et al. | 250/578 |
| 4,306,143 | 12/1981 | Utagawa et al. | 250/578 |

FOREIGN PATENT DOCUMENTS

| 2117248 | 2/1976 | Fed. Rep. of Germany . |
| WO81/02782 | 10/1981 | PCT Int'l Appl. . |
| 1436110 | 5/1976 | United Kingdom . |

Primary Examiner—Gene Wan
Attorney, Agent, or Firm—Spencer & Frank

[57] ABSTRACT

A photoelectric current amplifier comprises several partial amplifiers whose outputs lead to a common summing output.

4 Claims, 1 Drawing Figure

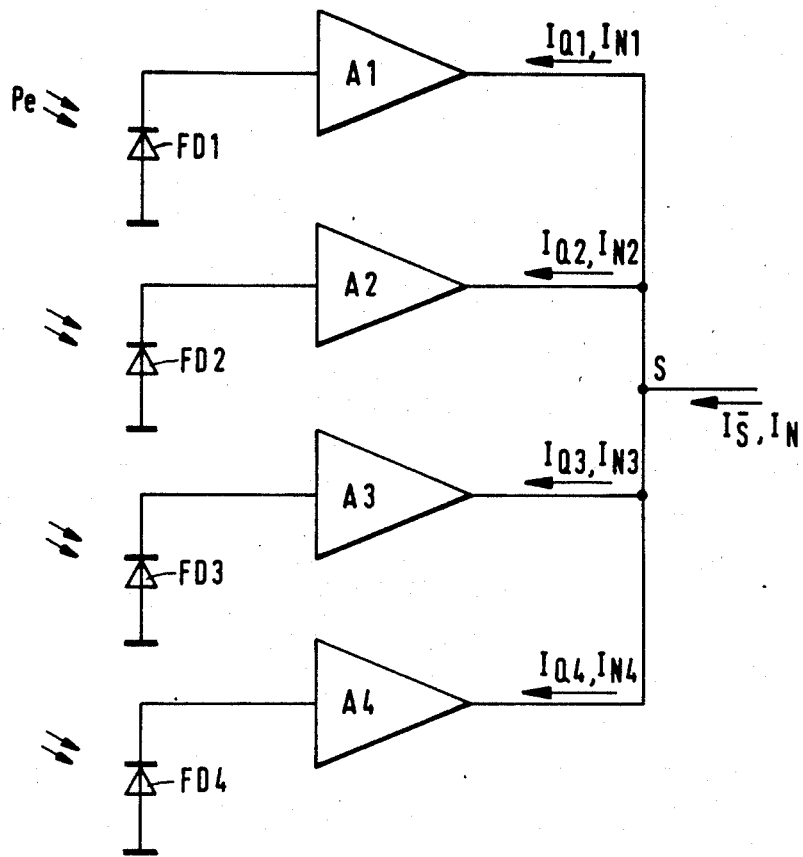

PHOTOELECTRIC CURRENT AMPLIFIER

BACKGROUND OF THE INVENTION

Photoelectric current amplifiers are known to amplify a photoelectric current which is supplied by a photoelectric current source when it is exposed to a corresponding radiation. A photodiode generally acts as photoelectric current source. Photoelectric current amplifiers are required to have a good signal-to-noise ratio and at the same time a large band width.

SUMMARY OF THE INVENTION

The object of the invention is to indicate a photoelectric current amplifier with the best possible signal-to-noise ratio and a large band width.

According to the invention there are provided in a photoelectric current amplifier several partial amplifiers whose outputs lead to a common output which sums the individual output signals up to a total signal.

The partial amplifiers ought to have identical electrical properties. A photoelectric current source precedes each individual partial amplifier. Photodiodes serve, for example, as photoelectric current sources.

BRIEF DESCRIPTION OF THE DRAWING

The invention will now be explained in greater detail, by way of example, with reference to the drawing, in which the FIGURE shows a photoelectric current amplifier.

DESCRIPTION OF THE PREFERRED EMBODIMENTS

The photodiode amplifier shown in the Figure comprises four partial amplifiers $A_1$, $A_2$, $A_3$ and $A_4$. Preceding each partial amplifier is one respective photodiode ($F_{D1}$, $F_{D2}$, $F_{D3}$, $F_{D4}$) as photoelectric current source.

The partial amplifiers $A_1$, $A_2$, $A_3$ and $A_4$ are homogeneous amplifiers with the same electrical properties, whose current outputs lead to common junction point S. The junction point S is the common output of the photoelectric current amplifier consisting of the partial amplifiers $A_1$, $A_2$, $A_3$ and $A_4$.

At the common output S, the output currents (output signals) $I_{Q1}$, $I_{Q2}$, $I_{Q3}$ and $I_{Q4}$ of the individual partial amplifiers are summed up to a total current $I_S$ which represents the resulting output signal $$I_S = I_{Q1} + I_{Q2} + I_{Q3} + I_{Q4}.$$

At the same summing point S, the output noise currents (noise signals) $I_{N1}$, $I_{N2}$, $I_{N3}$ and $I_{N4}$ of the individual partial amplifiers are also summed up to a total noise current $I_N$. If the partial amplifiers are not correlated, as can be readily assumed for photodiode amplifiers in the indicated circuit, the resulting noise current is $$I_N = \sqrt{I_{N1}^2 + I_{N2}^2 + I_{N3}^2 + I_{N4}^2}.$$

In the identical amplifiers, the signal and noise currents are, under ideal circumstances, also identical to one another, resulting in the following relationships:

$$I_S \approx 4 I_{Q1} \text{ and } I_N \approx \sqrt{4 I_N^2} = 2 I_{N1}$$

i.e. $I_S/I_N = 2 \cdot (I_{Q1}/I_{N1})$.

Compared with a single photoelectric current amplifier, the amplifier according to the invention with four partial amplifiers as in the embodiment has a signal-to-noise ratio which is improved by the factor 2. Since the parital amplifiers are connected in parallel without coupling to one another, the band width of the total amplifier equals the band width of the individual partial amplifier, which can be chosen relatively large without influencing the other ones. If the four partial amplifiers were replaced by a single amplifier of equal amplification with a photodiode surface which is larger by the factor 4, the same signal as in the embodiment would be obtained at the output. In this case, however, the band width of the signal transmission would also be lowered by the factor 4, since the 4-fold photodiode surface also corresponds to a 4-fold capacitance at the input of the amplifier and this together with the input resistance of the amplifier determines the band width of the signal transmission.

Four partial amplifiers are provided in the embodiment. A minimum of two partial amplifiers is required. In theory, the maximum number of identical partial amplifiers that can be used is unlimited. In practical application, it is expedient to interconnect between four and eight partial amplifiers to form a common amplifier.

Under ideal circumstances, the signal-to-noise ratio with n identical partial amplifiers is improved by the factor $\sqrt{n}$.

What is claimed is:

1. A photoelectric current amplifier for monitoring radiation from a single radiation source, comprising: a plurality of photoelectric current sources arranged to receive radiation from the single radiation source and producing an output current representative of radiation impinging thereon; a plurality of partial amplifiers each having an input connected to receive the output current from a respective current source, and an output providing a current proportional to the current received by its said input; and current summing means connected to said outputs of all of said partial amplifiers for providing am amplifier output current having an amplitude equal to the sum of the amplitudes of the currents provided at said outputs of all of said partial amplifiers.

2. A photoelectric current amplifier according to claim 1 wherein said partial amplifiers have substantially identical bandwidths and are electrically conductively connected together via their said outputs, whereby the bandwidth of said current amplifier is equal to the bandwidth of each said partial amplifier.

3. A photoelectric current amplifier according to claim 1, wherein the amplifiers exhibit identical electrical properties.

4. A photoelectric current amplifier according to claim 1, wherein photodiodes are provided as said photoelectric current sources.

* * * * *